United States Patent
Amirijoo et al.

(10) Patent No.: US 10,278,082 B2
(45) Date of Patent: Apr. 30, 2019

(54) METHODS AND NODES FOR ESTABLISHING A NEIGHBOR RELATION IN A WIRELESS NETWORK

(71) Applicant: Telefonaktiebolaget LM Ericsson (publ), Stockholm (SE)

(72) Inventors: Mehdi Amirijoo, Linköping (SE); Håkan Axelsson, Linköping (SE); Rasmus Axén, Linköping (SE); Fredrik Gunnarsson, Linköping (SE); Patrik Karlsson, Sollentuna (SE); Walter Müller, Upplands Väsby (SE); Christer Östberg, Staffanstorp (SE); Pradeepa Ramachandra, Linköping (SE); Henrik Ronkainen, Södra Sandby (SE); Thomas Walldeen, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 56 days.

(21) Appl. No.: 15/553,456

(22) PCT Filed: Oct. 6, 2016

(86) PCT No.: PCT/SE2016/050959
§ 371 (c)(1),
(2) Date: Aug. 24, 2017

(87) PCT Pub. No.: WO2018/067048
PCT Pub. Date: Apr. 12, 2018

(65) Prior Publication Data
US 2018/0249351 A1   Aug. 30, 2018

(51) Int. Cl.
*H04W 24/02* (2009.01)
*H04W 36/00* (2009.01)
*H04L 5/00* (2006.01)
*H04W 24/10* (2009.01)
(Continued)

(52) U.S. Cl.
CPC .......... *H04W 24/02* (2013.01); *H04L 5/0048* (2013.01); *H04W 8/005* (2013.01); *H04W 24/10* (2013.01);
(Continued)

(58) Field of Classification Search
CPC ..... H04W 24/02; H04W 24/10; H04W 8/005; H04W 36/0061; H04L 5/0048
See application file for complete search history.

(56) References Cited

U.S. PATENT DOCUMENTS

2009/0264130 A1* 10/2009 Catovic ............. H04W 36/0083
455/436
2010/0285802 A1* 11/2010 Ahluwalia ........ H04W 36/0083
455/436

(Continued)

FOREIGN PATENT DOCUMENTS

EP    2 487 952 A1   8/2012
EP    2 928 235 A1   10/2015
(Continued)

OTHER PUBLICATIONS

International Search Report and Written Opinion issued in International Application No. PCT/SE2016/050959, dated Jun. 1, 2017, 9 pages.
(Continued)

*Primary Examiner* — Gary Mui
(74) *Attorney, Agent, or Firm* — Rothwell, Figg, Ernst & Manbeck, p.c.

(57) ABSTRACT

Network nodes (102, 104), control node (100) and methods therein, for enabling establishment of a neighbor relation between a first network node (102) and a second network node (104) in a wireless network. The control node (100) sends (1:1) or distributes, to network nodes in the network including the first network node (702), a set of reference (Continued)

signals reserved for neighbor relation establishment. The second network node (104) transmits (1:3) one of the reserved reference signals which is then detected by a wireless device (D1) being served by the first network node (102) which then receives (1:4), from the wireless device (D1), a measurement report indicating the detected reference signal that is recognized by the first network node (102) as belonging to the set of reserved reference signals. The first network node (102) can then identify (1:5) the second network node (104), based on the reserved reference signal in the measurement report, and establishes (1:6) a neighbor relation with the identified second network node (104).

33 Claims, 5 Drawing Sheets

(51) Int. Cl.
  *H04W 8/00* (2009.01)
  *H04W 48/16* (2009.01)
(52) U.S. Cl.
  CPC ........ *H04W 36/0061* (2013.01); *H04W 48/16* (2013.01)

(56) References Cited

U.S. PATENT DOCUMENTS

| | | | | |
|---|---|---|---|---|
| 2012/0021748 | A1* | 1/2012 | Ostrup | H04W 76/10 455/437 |
| 2012/0026918 | A1* | 2/2012 | Won | H04W 36/0061 370/255 |
| 2012/0100884 | A1* | 4/2012 | Radulescu | H04W 36/0083 455/524 |
| 2012/0106370 | A1* | 5/2012 | Radulescu | H04W 36/0083 370/252 |
| 2012/0178451 | A1* | 7/2012 | Kubota | H04W 8/00 455/436 |
| 2012/0252448 | A1* | 10/2012 | Martin | H04W 36/0083 455/435.1 |
| 2013/0244718 | A1* | 9/2013 | Lee | H04W 36/0083 455/525 |
| 2013/0324119 | A1* | 12/2013 | Shi | H04W 24/10 455/434 |
| 2014/0287748 | A1* | 9/2014 | Lee | H04W 48/16 455/434 |
| 2015/0271714 | A1* | 9/2015 | Shetigar | H04W 36/0061 370/255 |
| 2016/0316467 | A1* | 10/2016 | Won | H04W 24/08 |
| 2017/0034750 | A1* | 2/2017 | Tamura | H04W 48/16 |
| 2017/0078895 | A1* | 3/2017 | Sriram | H04W 24/10 |
| 2018/0084449 | A1* | 3/2018 | Breuer | H04W 24/10 |

FOREIGN PATENT DOCUMENTS

| | | |
|---|---|---|
| WO | 2012151656 A1 | 11/2012 |
| WO | 2015122812 A1 | 8/2015 |

OTHER PUBLICATIONS

Dahlén, A. et al., "Evaluations of LTE Automatic Neighbor Relations", IEEE, 2011, 5 pages.

* cited by examiner

METHODS AND NODES FOR ESTABLISHING A NEIGHBOR RELATION IN A WIRELESS NETWORK

CROSS REFERENCE TO RELATED APPLICATION

This application is a 35 U.S.C. § 371 National Stage of International Patent Application No. PCT/SE2016/050959, filed Oct. 6, 2016, designating the United States, the disclosure of which is incorporated by reference.

TECHNICAL FIELD

The present disclosure relates generally to a first network node, a second network node, a control node, and methods therein, for enabling establishment of a neighbour relation between the first network node and the second network node in a wireless network.

BACKGROUND

In a wireless network comprising a plurality of network nodes, it is desirable to achieve high capacity and adequate performance in communication with wireless devices. For example, the operation of the network nodes can be made more efficient by establishing neighbour relations between network nodes so they can communicate directly with each other instead of using an intermediate core network or the like, e.g. to support and facilitate handover of wireless devices from one network node to another.

The term "wireless network" is used in this description to denote any network comprising network nodes such as base stations, access points, eNodeBs or the like which are capable of radio communication with wireless devices, e.g. by transmitting data and control information as well as reference signals that can be detected and measured by the wireless devices for evaluation of connections and channels. The nodes in the network that perform such radio communication with wireless devices are also generally denoted "network nodes" herein. Further, the term "wireless device" denotes any communication equipment that is capable of radio communication with network nodes in a wireless network. Some non-limiting examples of wireless devices that may be involved in the procedures described herein include mobile phones, smartphones, tablets, laptop computers and Machine-to-Machine, M2M, devices such as sensors and actuators. Throughout this description, the term "User Equipment", UE, may also be used instead of wireless device.

In order to evaluate whether a connection to a network node is suitable for communication and to configure various parameters for the communication, the wireless devices are required to perform measurements on predefined reference signals which are regularly transmitted from the network nodes, and to send measurement reports to a serving network node. These measurement reports are then used by the network nodes as a basis for making various decisions and settings, including handover and/or beam-switching decisions. In this description the reference signals are sometimes referred to as "Mobility Reference Signals", MRSes, which term is commonly used in this field.

Despite advanced radio network planning tools, it is very difficult to predict the radio propagation in detail and to identify network nodes between which handovers may potentially occur. As a consequence, it is difficult to determine which network nodes that need to have a relation and maybe also a direct connection for communication, e.g. prior to deployment of the network. In this description, the term "neighbour relation" is used to indicate that two neighbouring network nodes have a direct connection to one other, such as an X2 connection or interface as defined in Long Term Evolution, LTE, that can be used for communicating messages rapidly and directly with each other. A neighbour relation further indicates that the two neighbouring network nodes have certain knowledge about each other's configurations and characteristics. For example, each network node need to know a mapping of the neighbouring network node's reference signals to its IP address. Further, two neighbouring network nodes should be able to exchange various information over the connection to support mobility, interference management, etc.

The above issues have been addressed in LTE, where wireless devices could be requested to retrieve information such as a unique node identifier, also referred to as a "global" identifier, from system information broadcasted from unknown network nodes that have been recently installed, and to report the retrieved system information to the serving network node. Such information could then be used to convey messages from the serving network node to the unknown network node via the core network which maintains a lookup table from a unique node identifier to an established S1 connection. One such message was used to request transport network layer address information necessary for a direct network node to network node connection for the X2 interface. To achieve smooth operations of the mobility procedure in the network, each network node needs to have a concrete and up-to-date list of its neighboring network nodes which can be handover candidates for the wireless devices, as provided by the neighbour relations.

In LTE, establishment of neighbour relations is based on "always-on" reference signals, i.e. the reference signals are constantly transmitted so that they can be detected and read at any time. However, in a wireless network where the reference signals are not always-on by design, e.g. in order to minimize the amount of system control signaling in the network, the existing LTE solutions cannot be used. As a result, the unique global identifier, which should normally be transmitted over the network according to previous LTE technology, may not be available and used for a newly established network node. The global identifier was necessary to establish a neighbor relation according to conventional LTE technology. It is further a problem that a neighbor relation cannot be established in an efficient and simple manner without substantial impact on the operation of the network and/or the wireless devices.

SUMMARY

It is an object of embodiments described herein to address at least some of the problems and issues outlined above. It is possible to achieve this object and others by using a first network node, a second network node, a control node, and methods therein as defined in the attached independent claims.

According to one aspect, a method is performed by a first network node in a wireless network, for establishment of a neighbour relation with a second network node in the wireless network. In this method, the first network node obtains a set of reference signals reserved for neighbor relation establishment. At some point later, the first network node receives, from a wireless device served by the first network node, a measurement report indicating at least one detected reference signal that is recognized by the first network node as belonging to the set of reserved reference signals. The first network node then identifies the second network node based on the at least one detected reserved reference signal indicated in the received measurement report, and establishes a neighbor relation with the second network node.

According to another aspect, a first network node is arranged to establish a neighbour relation with a second network node in a wireless network. The first network node is configured to obtain a set of reference signals reserved for neighbor relation establishment. The first network node is also configured to receive, from a wireless device served by the first network node, a measurement report indicating at least one detected reference signal that is recognized by the first network node as belonging to the set of reserved reference signals. The first network node is further configured to identify the second network node based on the at least one detected reserved reference signal indicated in the received measurement report, and to establish a neighbor relation with the second network node.

According to another aspect, a method is performed by a second network node in a wireless network, for enabling establishment of a neighbour relation with a first network node in the wireless network. In this method, the second network node obtains, from a control node, at least one reference signal allocated to the second network node, the at least one reference signal belonging to a set of reference signals reserved for neighbor relation establishment. The second network node then transmits the at least one allocated reference signal to enable detection of the at least one allocated reference signal by a wireless device served by the first network node, so that the first network node can recognize the allocated reference signal(s) when included in a measurement report from the wireless device. The second network node can then establish a neighbor relation with the first network node when requested by the first network node.

According to another aspect, a second network node is arranged to enable establishment of a neighbour relation with a first network node in a wireless network. The second network node is configured to obtain, from a control node, at least one reference signal allocated to the second network node, the at least one reference signal belonging to a set of reference signals reserved for neighbor relation establishment. The second network node is also configured to transmit the at least one allocated reference signal to enable detection of the at least one allocated reference signal by a wireless device served by the first network node, and to establish a neighbor relation with the first network node when requested by the first network node.

According to another aspect, a method is performed by a control node for enabling establishment of a neighbour relation between a first network node and a second network node in a wireless network. In this method, the control node sends, at least to the first network node, a set of reference signals reserved for neighbor relation establishment, and allocates at least one reference signal to the second network node, the at least one allocated reference signal belonging to the set of reserved reference signals. The control node further provides, to the first network node, an identity of the second network node based on the at least one allocated reference signal when requested by the first network node, which enables the first and second network nodes to establish the neighbor relation.

According to another aspect, a control node is arranged to enable establishment of a neighbour relation between a first network node and a second network node in a wireless network. The control node is configured to send, at least to the first network node, a set of reference signals reserved for neighbor relation establishment, and to allocate at least one reference signal to the second network node, the at least one allocated reference signal belonging to the set of reserved reference signals. The control node is also configured to provide, to the first network node, an identity of the second network node based on the at least one allocated reference signal when requested by the first network node.

The above methods and nodes may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable establishment of a neighbour relation between two network nodes in a wireless network by utilizing a measurement report from a wireless device indicating at least one detected reference signal that is recognized as belonging to a set of reference signals that have been reserved specifically for neighbour relation establishment. The measurement report is transmitted by the wireless device to a serving network node, herein called a first network node, and the at least one detected reference signal has been allocated to and was transmitted by another neighbouring network node, herein called a second network node, which may be hitherto unknown to the first network node. Thereby, the first network node is able to identify the second network node as a neighbour, based on the detected and reported reserved reference signal(s), and a neighbour relation can be established between the first and second network nodes to facilitate and expedite handover related communication between the two nodes.

The above identification of the second network node is made possible by allocating the at least one detected reference signal to the second network node by a control node, which is done before the second network node transmits the reference signal(s) for detection and measurements. An example of how the above features may be accomplished in a wireless network will now be described with reference to the communication scenario of FIG. 1 involving the above control node 100, the first network node 102 and the second network node 104. In this scenario, a wireless device D1 is currently being served by the first network node 102, either in connected or idle mode depending on the current state of the device D1.

Figure 1:
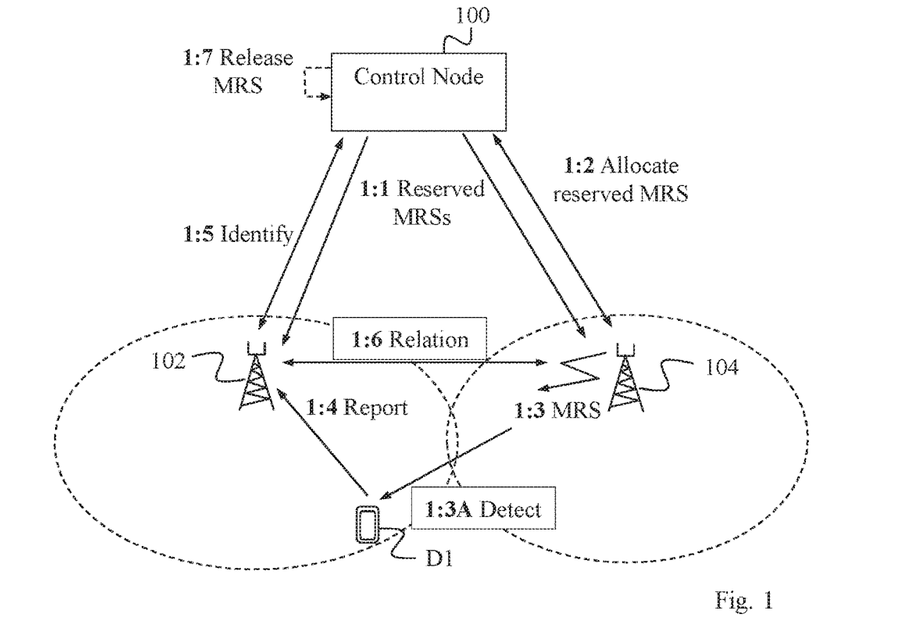
FIG. 1 is a communication scenario illustrating an example of how the solution may be employed, according to some possible embodiments.

As mentioned above, wireless devices are generally required to perform measurements of reference signals transmitted by any network nodes within transmission range or "hearing distance", in this case including the second network node 104, and to report their measurements to a serving network node, in this case the first network node 102. Among other things, it is an advantage of the following features that they do not affect the operation of the wireless device D1 which can thus operate as normal in this procedure. Even though only one wireless device D1 is shown to be involved in this example, it should be understood that there may be any number of wireless devices operating in the same manner.

The control node 100 is arranged to enable establishment of a neighbour relation between network nodes in the wireless network, and the control node 100 may be implemented in a central entity such as an Operation & Maintenance node or the like which controls operation in multiple network nodes, at least in the manner described. In the context described herein, the control node 100 may alternatively be referred to as an MRS bootstrap coordination unit, as an example.

In a first shown action 1:1, the control node 100 communicates a set of reserved reference signals to network nodes in a certain area which include the first and second network nodes 102, 104, e.g. in a common broadcast message or in several dedicated messages directed individually to the network nodes. The reference signals in this set have been specifically reserved for neighbour relation establishment although they can also be used for evaluation of communication links. Thereby, a network node that receives a measurement report from a wireless device is able to recognize that such a reserved reference signal indicated in the report and realize that the wireless device has detected the reference signal from another network node that is, at least potentially, unknown to the network node serving that device.

In this example, the second network node 104 is new to the network and has thus recently been installed and activated, thereby being unknown to the first network node 102. Alternatively, the second network node 104 may have been reconfigured in such a way that it would be helpful or even necessary to update any existing neighbour relations with surrounding network nodes and/or to add new ones. This may be the case e.g. when the node's coverage or transmission range has been changed.

Knowing that one or more neighbour relations need to be established/updated, the second network node 104 obtains from the control node 100 an allocation of a reference signal to the second network node 104, which reference signal belongs to the set of reserved reference signals, as shown by another action 1:2. The allocated reference signal is then to be used for neighbour relation establishment as follows. In this action the second network node 104 may send an allocation request to the control node 100 which responds by returning the allocated reference signal to the second network node 104. The control node 100 may first check if there is any reference signal available at the moment, of if all the reserved reference signals have already been allocated to other network nodes. It should be noted that more than one reference signal may be allocated to the second network node 104, e.g. for use in different cell sectors or in multiple beams transmitted by the second network node 104 so that each allocated reference signal is associated to a corresponding beam or cell sector.

Having obtained the allocation of one or more reserved reference signals, referred to as an allocated reference signal for simplicity, the second network node 104 transmits the allocated reference signal, denoted MRS in the figure, in an action 1:3. The allocated reference signal may as such be transmitted according to regular procedures at predefined and known occasions, to enable detection and measurement by any wireless devices within transmission range. Another action 1:3A indicates that the wireless device D1 detects the allocated reference signal when transmitted from the second network node 104. In due course, the wireless device D1 sends a measurement report to its serving network node, i.e. to the first network node 102, as shown in an action 1:4, which report indicates the detected reference signal that was allocated to the second network node 104 for neighbour relation establishment. The wireless device D1 thus handles the detected reference signal according to regular procedures, as indicated above.

Having received the report and recognized that the reference signal indicated therein belongs to the set of reserved reference signals communicated by the control node 100 in action 1:1, the first network node 102 identifies which network node the reference signal is allocated to, as indicated by a further action 1:5. In this action, the first network node 102 sends an identification request to the control node 100 based on the reported reference signal, and the control node 100 responds to the first network node 102 by identifying the second network node 104. In this action, the second network node 104 may be identified by its IP address or some global identity which can be used for connection establishment.

After the above actions, the first network node 102 is made aware that the wireless device D1 that is currently being served by network node 102 is able to detect signals transmitted from the second network node 104, which thereby qualifies the second network node 104 as a potential candidate for future handovers of wireless devices in either direction, i.e. to or from the network node 104. It would therefore be helpful to have a relation with that network node 104, as defined above, so that the handover process can be executed rapidly and efficiently.

If there is no valid relation already existing, the first network node 102 then performs establishment of a neighbour relation with the second network node 104, as indicated by another action 1:6. In this action, both nodes 102, 104 may add one another to a list of neighbouring network nodes together with information about connection parameters and other characteristics. The process of establishing a neighbor relation in a wireless network is known as such and is not necessary to describe in any detail herein. Moreover, the neighbor relation establishment as such is somewhat outside the scope of this solution, while some examples are disclosed in https://www.ericsson.com/res/docs/2013/evaluations-of-lte-automatic-neighbor-relations.pdf.

The second network node 104 may continue to transmit its allocated reference signal as of action 1:3 so that neighbour relations may be established with further network nodes according to the above actions 1:3A-1:6. At some point later, e.g. when a certain time has passed since the latest establishment of neighbour relation or when the amount of link failures for wireless communications falls below a threshold, the second network node 104 will know that its list of neighbouring network nodes has been completed and that it does not need the allocated reference signal anymore. The second network node 104 may then send a release request to the control node 100, to release the allocation of the at least one reference signal to the second network node 104 so that the control node 100 can release the allocation in an action 1:7 and the reference signal can be allocated to other network nodes that need to establish neighbour relations in the manner described above.

The solution disclosed herein may thus be realized by functionality in a first network node, a second network node and a control node, which will now be described in more detail by referring to the flow charts in FIGS. 2-5. An example procedure will now be described, with reference to the flow chart in FIG. 2, of how the solution may be employed in terms of actions performed by a first network node in a wireless network, such as the above-described network node 102, for establishment of a neighbour relation with a second network node in the wireless network, such as the above-described network node 104. Reference will sometimes also be made, without limiting the features described, to the example shown in FIG. 1. The procedure illustrated by FIG. 2 can thus be used to accomplish the functionality described above for the first network node 102.

Figure 2:
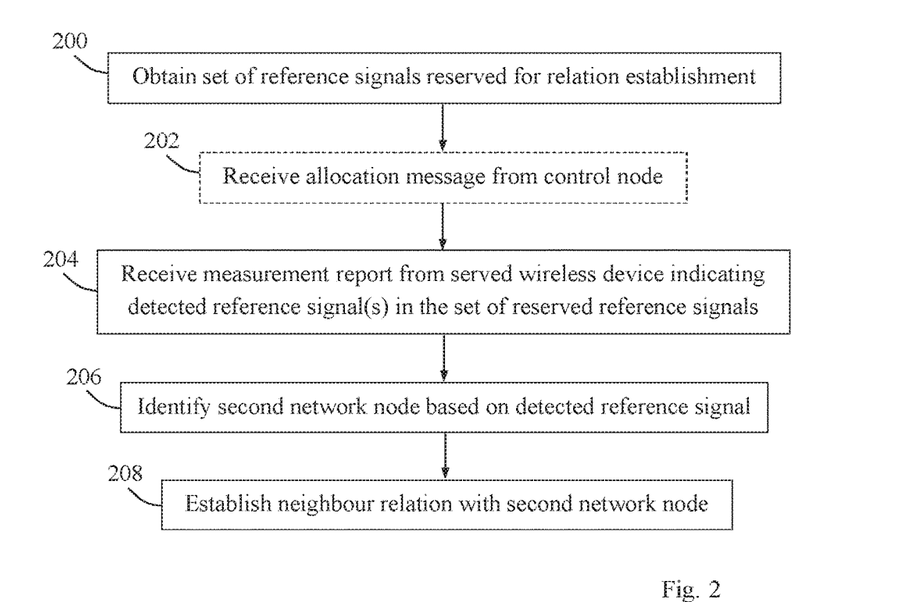
FIG. 2 is a flow chart illustrating a procedure in a first network node, according to further possible embodiments.

A first action 200 illustrates that the first network node 102 obtains a set of reference signals that have been reserved for neighbour relation establishment, which corresponds to action 1:1 above where the reserved set of reference signals is distributed to network nodes by a control node 100. Thereby, the first network node 102 is able to recognize whether a reported reference signal belongs to the reserved set or not. Optionally, the first network node 102 may further receive an allocation message distributed from the control node 100, as shown by an action 202, which indicates that one or more reference signals from the reserved set have been allocated to the second network node 104.

In a further action 204, the first network node 102 receives, from a wireless device D1 served by the first network node 102, a measurement report indicating at least one detected reference signal that is recognized by the first network node 102 as belonging to the set of reserved reference signals. This action corresponds to action 1:4 above.

The first network node 102 then identifies the second network node 104 based on the at least one detected reserved reference signal indicated in the received measurement report, in a following action 206 corresponding to action 1:5 above. In an example embodiment, the second network node 104 may be identified by obtaining an identity of the second network node 104 from the control node 100, based on the at least one detected reference signal indicated in the received measurement report. In an alternative example embodiment, the second network node 104 may instead be identified from an IP address or global identity of the second network node 104 indicated in the allocation message received from the control node 100 in action 202. A final action 208 illustrates that the first network node 102 establishes a neighbour relation with the second network node 104, which corresponds to action 1:6 above.

In another example embodiment, multiple detected reference signals belonging to the set of reserved reference signals may be indicated in the received measurement report, the indicated reference signals being allocated to respective mobility beams transmitted by the second network node 104. Thus, if the second network node 104 is capable of beamforming which is a known technique as such in the art, different reference signals may be transmitted in different beams so that a wireless device can generally be located more precisely based on its reported reference signal(s).

This embodiment enables establishment of a neighbour relation on a beam level, sometimes referred to as a "beam relation", with the second network node 104. It was mentioned above that multiple reference signals may be allocated to the second network node 104 so that each allocated reference signal is associated to a corresponding mobility beam. As a result, the second network node 104 may be a potential candidate only for handover to one or more specific mobility beams depending on which reserved reference signals are reported from wireless devices.

In another example embodiment, the established neighbour relation with the second network node 104 may be used for communication of handover and/or beam switching messages. In yet another example embodiment, the reserved reference signals may be bootstrap Mobility Reference Signals, MRSs.

Another example procedure will now be described, with reference to the flow chart in FIG. 3, of how the solution may be employed in terms of actions performed by a second network node in a wireless network, such as the above-described network node 104, for establishment of a neighbour relation with a first network node in the wireless network, such as the above-described network node 102. Reference will likewise be made, without limiting the features described, to the example shown in FIG. 1. The procedure illustrated by FIG. 3 can thus be used to accomplish the functionality described above for the second network node 104.

A first action 300 illustrates that the second network node 104 obtains, from a control node 100, at least one reference signal allocated to the second network node 104, the at least one reference signal belonging to a set of reference signals reserved for neighbour relation establishment. This action corresponds to action 1:2 above. In an example embodiment, the at least one allocated reference signal may be obtained by sending an allocation request to the control node 100 which would then return a response with the allocated reference signal(s).

In a next action 302, the second network node 104 transmits the at least one allocated reference signal to enable detection of the at least one allocated reference signal by a wireless device D1 served by the first network node 102. This action corresponds to action 1:3 above. The transmitted reference signal may of course be detected and reported by more than one wireless device and the solution is not limited in this respect.

In a further action 304, the second network node 104 establishes a neighbour relation with the first network node 102 when requested by the first network node 102. It is thus the first network node 102 that initiates the relation establishment as of action 208 after having recognized that a reference signal reported by the wireless device D1 belongs to the set of reserved reference signals and identified the second network node 104, as of actions 204-206. In an example embodiment, if the second network node 104 is capable of beamforming, multiple allocated reference signals may be obtained from the control node 100 and transmitted in respective mobility beams, which enables establishment of a neighbour relation on a beam level as explained above.

In another example embodiment, the second network node 104 may send a release request to the control node 100, as shown in an optional action 306, to release the allocation of the at least one reference signal to the second network node 104. As indicated above, the second network node 104 may be triggered to send the release request e.g when a certain time has passed since the latest establishment of neighbour relation, or when the amount of link failures for wireless communications falls below a certain threshold. Another example embodiment in this procedure may be that the reserved reference signals are bootstrap Mobility Reference Signals, MRSs, which was also mentioned above.

Another example procedure will now be described, with reference to the flow chart in FIG. 4, of how the solution may be employed in terms of actions performed by a control node, such as the above-described control node 100, for enabling establishment of a neighbour relation between a first network node, such as the above-described network node 102, and a second network node in a wireless network, such as the above-described network node 104. Reference will again also be made, without limiting the features described, to the example shown in FIG. 1. The procedure illustrated by FIG. 4 can thus be used to accomplish the functionality described above for the control node 100.

A first action 400 illustrates that the control node 100 sends, at least to the first network node 10, a set of reference signals reserved for neighbour relation establishment. In this action, the control node 100 may distribute the set of reserved reference signals to any number of network nodes including nodes 102 and 104, and the solution is not limited in this respect. This action corresponds to actions 1:1 and 200 above.

It is also possible to reserve reference signals for neighbour relation establishment in different parts or areas of the network, e.g. such that a first set of reference signals is reserved for a first part, a second set of reference signals is reserved for a second part, and so forth. It may also be possible to reuse the same reference signals for neighbour relation establishment in two or more parts of the network which are beyond transmission range so that conflicts and collisions do not occur. For example, if a first set of reference signals is reserved for a first part of the network and a second set of reference signals is reserved for a second part of the network, the first set of reference signals may be reused for a third part of the network and the second set of reference signals may be reused for a fourth part of the network. This would provide efficient usage of the reference signals across the network assuming that transmissions in the first part cannot be detected in the third part, and vice versa, and likewise that transmissions in the second part cannot be detected in the fourth part, and vice versa.

A next optional action 402 indicates that an allocation request is received from the second network node 104. In a next action 404, the control node 100 allocates at least one reference signal to the second network node 104, the at least one allocated reference signal belonging to the set of reserved reference signals. This action corresponds to actions 1:2 and 300 above. As also mentioned above, the control node 100 may need to first check in the set whether there are any free reserved reference signals not currently allocated to any other network node.

In a further action 406, the control node 100 provides, to the first network node 102, an identity of the second network node 104 based on the at least one allocated reference signal when requested by the first network node 102. It is thus assumed that the control node 100 has a mapping or the like between allocated reference signals and the network nodes using the reference signals, so that it can determine to which network node a certain reference signal has been allocated.

In an example embodiment, the at least one reference signal may be allocated and provided to the second network node 104 in response to an allocation request received from the second network node 104 as of action 402. In another example embodiment, multiple allocated reference signals may be allocated to the second network node 104 for use in respective mobility beams transmitted by the second network node 104. The use of specific reserved reference signals in respective mobility beams has been described above.

In another example embodiment, the control node 100 may release the allocation of the at least one reference signal to the second network node 104, as shown by a final action 408, which may be done in response to a release request received from the second network node 104. Alternatively, the allocation may be released automatically after a certain timeout period has expired. In another example embodiment, the at least one allocated reference signal may be at least one bootstrap Mobility Reference Signal, MRS, which has also been mentioned above.

As mentioned above, it is an advantage of the procedures and features described herein that wireless devices in the wireless network do not need to be modified and can thus operate with normal behaviour without requiring any additional signalling to or from the devices. Another advantage is that network nodes are able to find suitable neighbouring nodes in a simple but efficient and reliable manner in order to establish neighbour relations when really motivated. The solution can also be used for establishing beam relations with a neighbour since reserved reference signals can be allocated and used in corresponding mobility beams.

Figure 5:
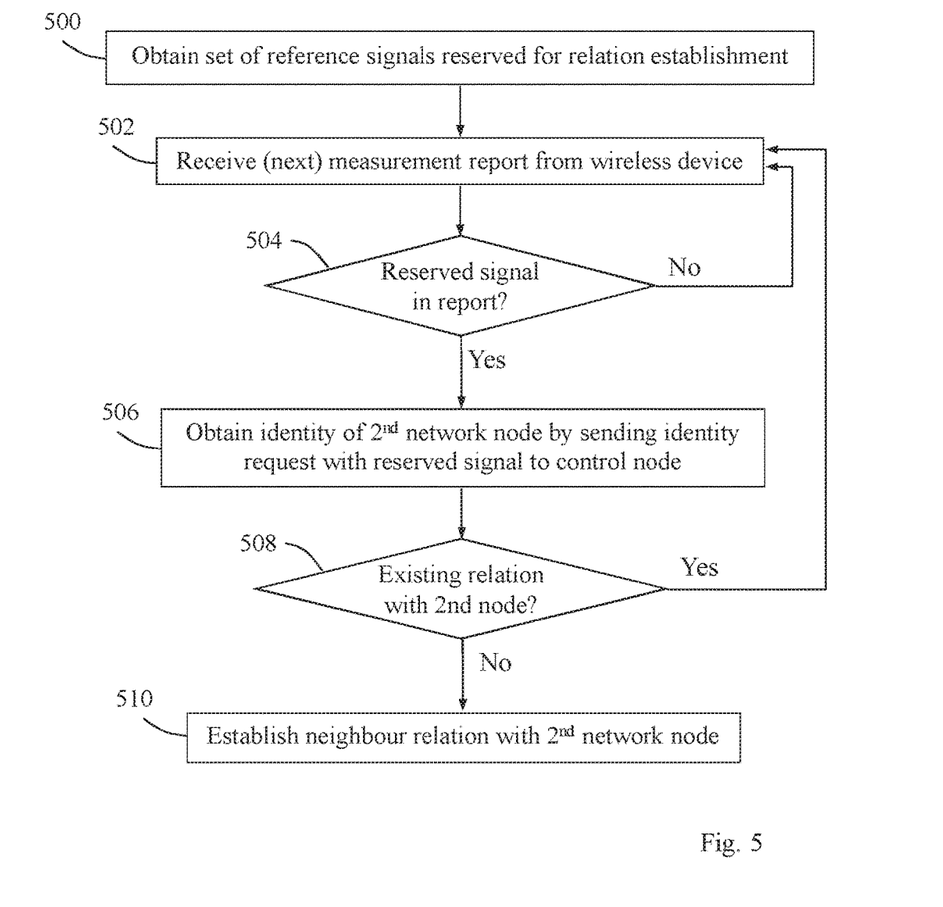
FIG. 5 is a flow chart illustrating an example of how the first network node may operate when the solution is employed, according to further possible embodiments.

A further detailed but non-limiting example of how the procedure of FIG. 2 may be realized in practice, will now be described with reference to the flow chart in FIG. 5 which thus illustrates actions performed by the first network node 102. In a first action 500, the first network node 102 obtains a set of reference signals that have been reserved for neighbour relation establishment, i.e. the same as action 200. A next action 502 illustrates that the first network node 102 receives a measurement report from a wireless device, corresponding to action 204 above. It is then checked in an action 504 whether the received report indicates any of the reserved reference signals obtained in action 500. If not, the procedure returns to action 502 by receiving a next measurement report from a wireless device which may be the same wireless device sending a new report or another wireless device.

If it is found in action 504 that a reserved reference signal is present in the received report, the first network node 102 obtains the identity of a second network node 104, in another action 506, by sending an identity request with the detected and reported reserved reference signal to the control node 100. This action corresponds to action 206 which has been explained above. The first network node 102 then further checks, in an action 508, whether it already has an existing neighbour relation with the identified second network node 104 or not. If so, the procedure may return to action 502 by receiving a next measurement report from a wireless device, and so forth. However, if it is found in action 508 that there is no existing neighbour relation with the second network node 104, the first network node 102 duly establishes a new neighbour relation with the second network node 104, in a final shown action 510.

Figure 6:
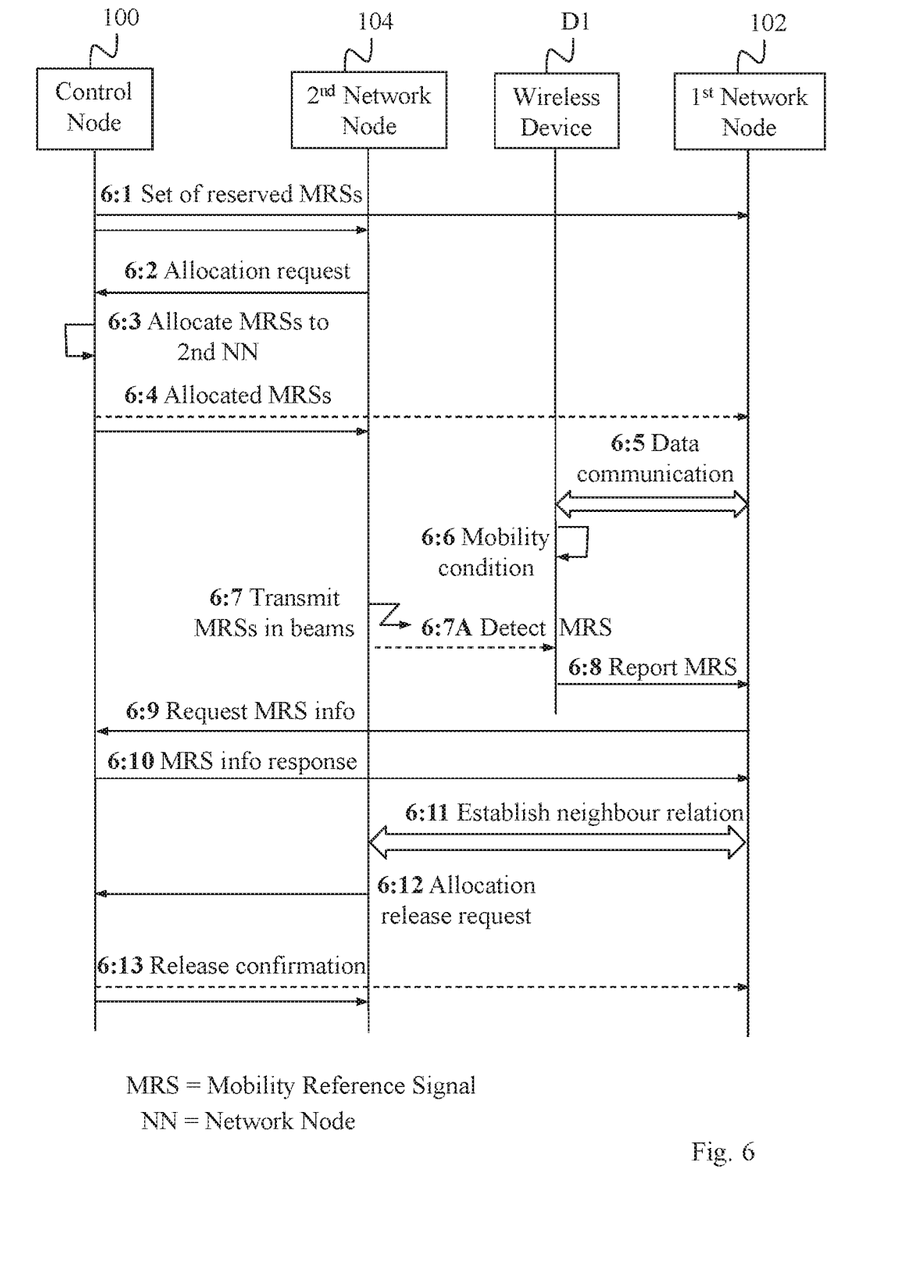
FIG. 6 is a signaling diagram illustrating an example of a procedure when the solution is used, according to further possible embodiments.

Yet another detailed but non-limiting example of how the procedures of FIGS. 2-4 may be realized in practice, will now be described with reference to the signaling diagram in FIG. 6 which thus illustrates a communication involving the control node 100, the first network node 102, the second network node 104 and a wireless device D1. A first action 6:1 illustrates that the control node 100 distributes a set of reference signals, i.e. MRSs, that have been reserved for neighbour relation establishment, to various network nodes including the first network node 102, corresponding to actions 200 and 400. In a next action 6:2, the second network node 104 sends an allocation request to the control node 100, corresponding to action 402. The control node 100 then allocates multiple reference signals, MRSs, to the second network node 104 in an action 6:3, e.g. in the manner described above for action 404, and sends the allocated MRSs to the second network node 104 in another action 6:4. In this action, the allocation of MRSs to node 104 may optionally also be sent to other network nodes including the first network node 102, as indicated by a dashed arrow. This may be done to indicate that network nodes other than node 104 are forbidden to transmit the allocated MRSs.

A further action 6:5 indicates that the wireless device D1 is connected to the first network node 102 and communicates data over that connection, the first network node 102 thus being a serving network node for the device D1. Another action 6:6 indicates that a mobility condition is triggered in the wireless device D1, meaning that device D1 will initiate mobility measurements of MRSs. In a next action 6:7, the second network node 104 transmits the allocated MRSs in different corresponding mobility beams to enable detection of the transmitted MRSs by any wireless device located within transmission range. As a result, the wireless device D1 is able to detect one of the transmitted MRSs, in an action 6:7A, by being located in a position where that MRS can be detected which would be within, or close enough to, the corresponding mobility beam. The wireless device D1 then sends a measurement report to the serving first network node 102, in an action 6:8, where the detected MRS is indicated in the report.

Having recognized that the MRS indicated in the report belongs to the set of reserved reference signals distributed in action 6:1, the first network node 102 sends a request for MRS information to the control node 100, in a following action 6:9, which is effectively the identification request described above for action 1:5. The control node 100 then identifies the second network node 104 to which the MRS has been allocated and returns an MRS information response to the first network node 102, in a following action 6:10, indicating the identity of the second network node 104, e.g. in the form of an IP address or global identity that can be used for establishing a connection with network node 104.

A further action 6:11 indicates that a neighbour relation is established between the first and second network nodes 102, 104, corresponding to the above actions 208 and 304. At some point later, the second network node 104 decides that it does not need the allocated MRSs anymore and sends an allocation release request to the control node 100, in an action 6:12. The control node 100 then releases the allocation and sends a release confirmation to the second network node 104 and optionally also to the first network node 102 (dashed arrow), in an action 6:13.

Figure 7:
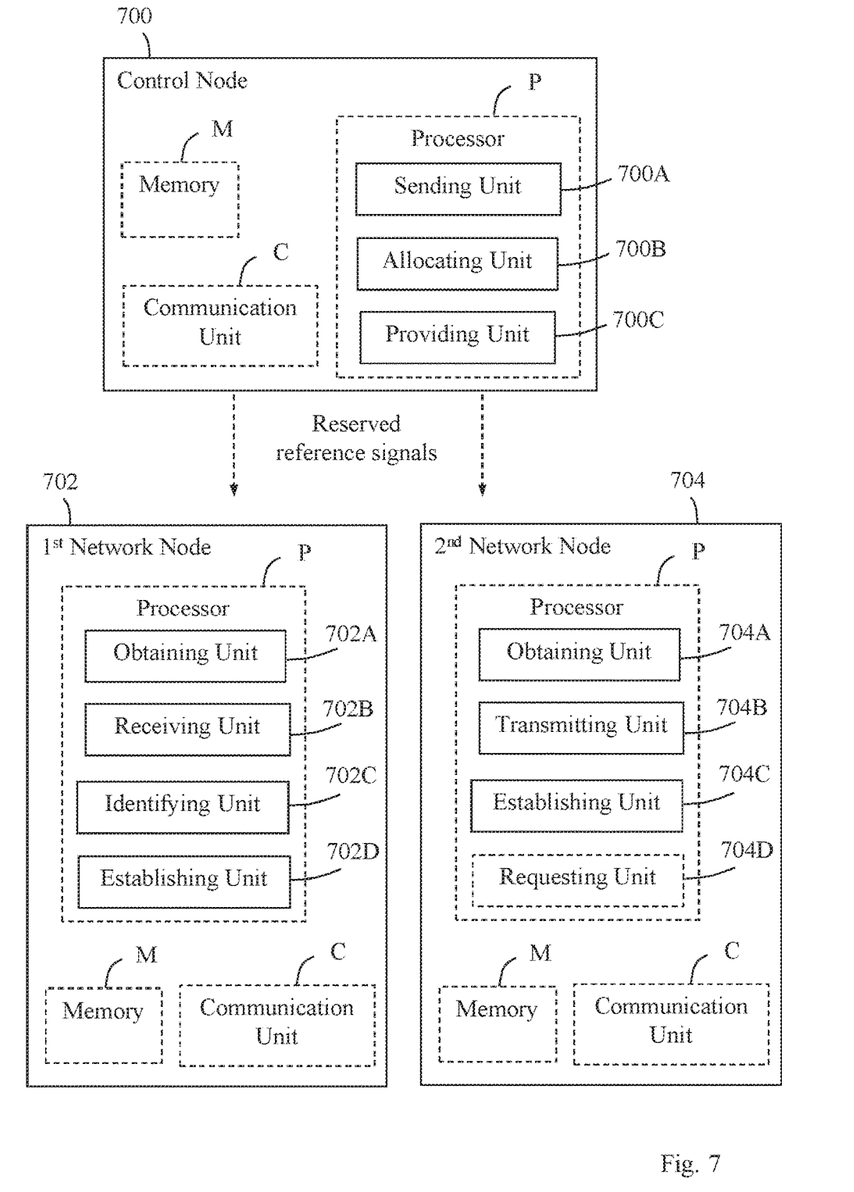
FIG. 7 is a block diagram illustrating a first network node, a second network node and a control node in more detail, according to further possible embodiments.

It was mentioned above that the procedures illustrated in FIGS. 2, 3 and 4, and the above-described embodiments thereof, are performed by a first network node, a second network node and a control node, respectively. The block diagram in FIG. 7 illustrates a detailed but non-limiting example of how a control node 700, a first network node 702 and a second network node 704 may be structured to bring about the above-described solution and embodiments thereof.

Each of the control node 700, a first network node 702 and a second network node 704 is shown to comprise a processor P and a memory M, the memory M comprising instructions executable by said processor P whereby the control node 700 and the first and second network nodes 702, 704, respectively, are operative as described herein. The solution and embodiments herein are not limited to using any specific types of networks, technology or protocols for communication even though LTE has been used herein as an illustrative example. The first network node 702 may thus be configured to operate according to any of the above-described examples and embodiments described for FIGS. 2 and 5. Further, the second network node 704 may be configured to operate according to any of the above-described examples and embodiments described for FIG. 3. Also, the control node 700 may be configured to operate according to any of the above-described examples and embodiments described for FIG. 4.

The first network node 702 comprises means configured or arranged to perform at least some of the actions 200-208 of the flow chart in FIG. 2. The first network node 702 is arranged establish a neighbour relation with a second network node 704 in a wireless network.

The first network node 702 is configured to obtain a set of reference signals reserved for neighbour relation establishment. This operation may be performed by an obtaining unit 702A in the first network node 702, e.g. in the manner described for action 200 above. The first network node 702 is also configured to receive from a wireless device served by the first network node 702, a measurement report indicating at least one detected reference signal that is recognized by the first network node 702 as belonging to the set of reserved reference signals. This operation may be performed by a receiving unit 702B in the first network node 702, e.g. in the manner described for action 204 above.

The first network node 702 is also configured to identify the second network node 704 based on the at least one detected reserved reference signal indicated in the received measurement report. This operation may be performed by an identifying unit 702C in the first network node 702, e.g. in the manner described for action 206 above. The first network node 702 is further configured to establish a neighbour relation with the second network node 704. This operation may be performed by an establishing unit 702D in the first network node 702, e.g. in the manner described for action 208 above.

Figure 3:
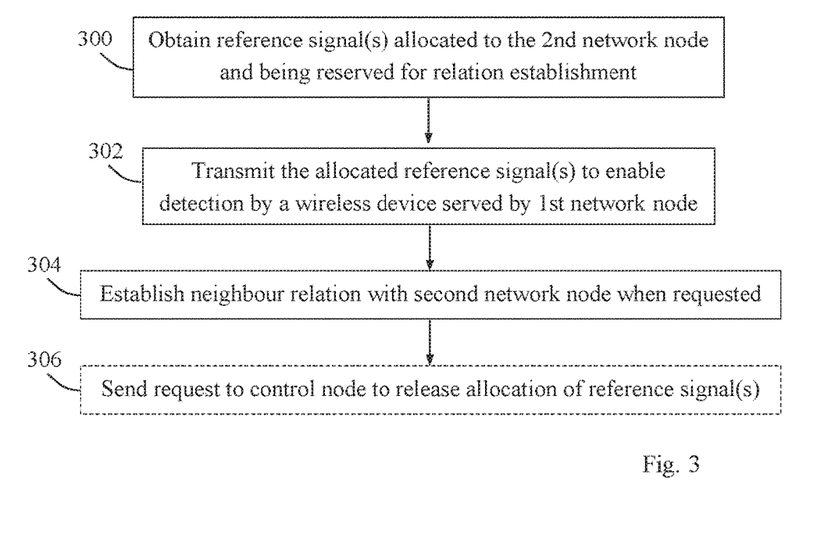
FIG. 3 is a flow chart illustrating a procedure in a second network node, according to further possible embodiments.

The second network node 704 comprises means configured or arranged to perform at least some of the actions 300-306 of the flow chart in FIG. 3. The second network node 704 is arranged to enable establishment of a neighbour relation with a first network node 702 in a wireless network.

The second network node 704 is configured to obtain, from a control node 700, at least one reference signal allocated to the second network node 704, the at least one reference signal belonging to a set of reference signals reserved for neighbour relation establishment. This operation may be performed by an obtaining unit 704A in the second network node 704, e.g. in the manner described for action 300 above. The second network node 704 is also configured to transmit the at least one allocated reference signal to enable detection of the at least one allocated reference signal by a wireless device served by the first network node 702. This operation may be performed by a transmitting unit 704B in the second network node 704, e.g. in the manner described for action 302 above.

The second network node 704 is also configured to establish a neighbour relation with the first network node 702 when requested by the first network node 702. This operation may be performed by an establishing unit 704C in the second network node 704, e.g. in the manner described for action 304 above. The second network node 704 may further be configured to send a release request to the control node 700 to release the allocation of the at least one reference signal to the second network node 704. This operation may be performed by a sending unit 704D in the second network node 704, e.g. in the manner described for action 306 above.

Figure 4:
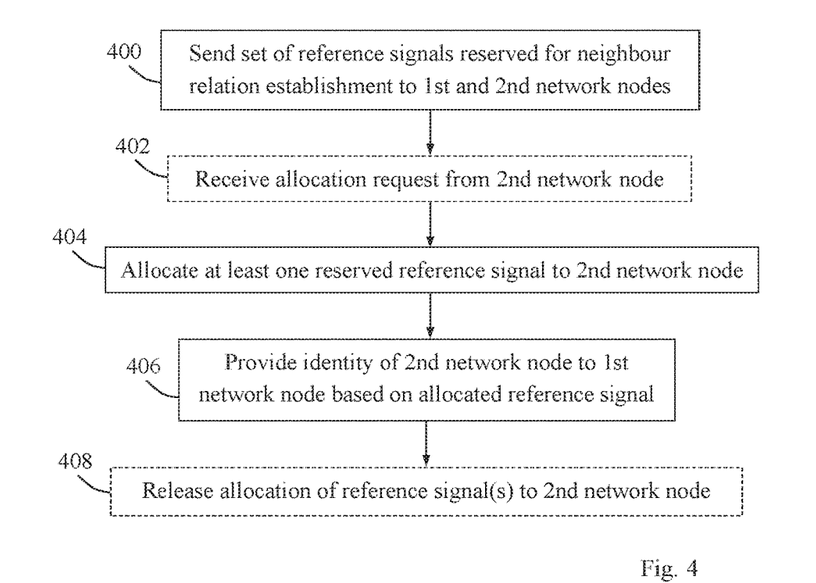
FIG. 4 is a flow chart illustrating a procedure in a control node, according to further possible embodiments.

The control node 700 comprises means configured or arranged to perform at least some of the actions 400-408 of the flow chart in FIG. 4. The control node 700 is arranged to enable establishment of a neighbour relation between a first network node 702 and a second network node 704 in a wireless network.

The control node 700 is configured to send, at least to the first network node 702, a set of reference signals reserved for neighbour relation establishment, as indicated by dashed arrows. This operation may be performed by a sending unit 700A in the control node 700, e.g. in the manner described for action 400 above. It should be noted that in this operation the term "send" means that the reserved set of reference signals is somehow distributed or communicated to the first network node 702 and preferably also to other network nodes in the network which is however outside the scope of this solution. The control node 700 is also configured to allocate at least one reference signal to the second network node 704, the at least one allocated reference signal belonging to the set of reserved reference signals. This operation may be performed by an allocating unit 700B in the control node 700, e.g. in the manner described for action 404 above.

The control node 700 is also configured to provide, to the first network node 702, an identity of the second network node 704 based on the at least one allocated reference signal when requested by the first network node 702. This operation may be performed by a providing unit 700C in the control node 700, e.g. in the manner described for action 406 above.

It should be noted that FIG. 7 illustrates various functional units in the control node 700, the first network node 702 and the second network node 704, respectively, and the skilled person is able to implement these functional units in practice using suitable software and hardware. Thus, the solution is generally not limited to the shown structures of the control node 700, the first network node 702 and the second network node 704, and the functional units 700A-C, 702A-D and 704A-D therein may be configured to operate according to any of the features and embodiments described in this disclosure, where appropriate.

The functional units 700A-C, 702A-D and 704A-D described above may be implemented in the control node 700, the first network node 702 and the second network node 704, respectively, by means of program modules of a respective computer program comprising code means which, when run by the processor P causes the control node 700, the first network node 702 and the second network node 704 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the control node 700, the first network node 702 and the second network node 704 in the form of a memory having a computer readable medium and being connected to the processor P. The computer program product or memory M in each of the control node 700, the first network node 702 and the second network node 704 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective control node 700, first network node 702 and second network node 704.

The solution described herein may be implemented in each of the control node 700, the first network node 702 and the second network node 704 by a computer program comprising instructions which, when executed on at least one processor, cause the at least one processor to carry out the actions according to any of the above embodiments, where appropriate. The solution may also be implemented at each of the control node 700, the first network node 702 and the second network node 704 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "wireless network", "wireless device", "control node", "reference signal", "neighbour relation" and "measurement report" have been used throughout this disclosure, although any other corresponding entities, functions, and/or parameters could also be used having the features and characteristics described here. The solution is defined by the appended claims.

The invention claimed is:

1. A method performed by a first network node in a wireless network for establishment of a neighbour relation with a second network node in the wireless network, the method comprising:
obtaining a set of reference signals reserved for neighbour relation establishment,
receiving, from a wireless device served by the first network node, a measurement report indicating at least one detected reference signal that is recognized by the first network node as belonging to the set of reserved reference signals,
identifying the second network node based on the at least one detected reserved reference signal indicated in the received measurement report, and
establishing a neighbour relation with the second network node.

2. The method of claim 1, wherein the second network node is identified by obtaining an identity of the second network node from a control node, based on the at least one detected reference signal indicated in the received measurement report.

3. The method of claim 1, wherein the second network node is identified from an IP address or global identity of the second network node indicated in an allocation message received from a control node.

4. The method of claim 1, wherein multiple detected reference signals belonging to the set of reserved reference signals are indicated in the received measurement report, the indicated reference signals being allocated to respective mobility beams transmitted by the second network node.

5. The method of claim 1, wherein the established neighbour relation with the second network node is used for communication of handover and/or beam switching messages.

6. The method of claim 1, wherein the reserved reference signals are bootstrap Mobility Reference Signals, MRSs.

7. A first network node arranged to establish a neighbour relation with a second network node in a wireless network, wherein the first network node is configured to:
  obtain a set of reference signals reserved for neighbour relation establishment,
  receive from a wireless device served by the first network node, a measurement report indicating at least one detected reference signal that is recognized by the first network node as belonging to the set of reserved reference signals,
  identify the second network node based on the at least one detected reserved reference signal indicated in the received measurement report, and
  establish a neighbour relation with the second network node.

8. The first network node of claim 7, wherein the first network node is configured to identify the second network node by obtaining an identity of the second network node from a control node, based on the at least one detected reference signal indicated in the received measurement report.

9. The first network node of claim 7, wherein the first network node is configured to identify the second network node from an IP address or global identity of the second network node indicated in an allocation message received from a control node.

10. The first network node of claim 7, wherein multiple detected reference signals belonging to the set of reserved reference signals are indicated in the received measurement report, the indicated reference signals being allocated to respective mobility beams transmitted by the second network node.

11. The first network node of claim 7, wherein the first network node is configured to use the established neighbour relation with the second network node for communication of handover and/or beam switching messages.

12. The first network node of claim 7, wherein the reserved reference signals are bootstrap Mobility Reference Signals, MRSs.

13. A method performed by a second network node in a wireless network, for enabling establishment of a neighbour relation with a first network node in the wireless network, the method comprising:
  obtaining from a control node, at least one reference signal allocated to the second network node, the at least one reference signal belonging to a set of reference signals reserved for neighbour relation establishment,
  transmitting the at least one allocated reference signal to enable detection of the at least one allocated reference signal by a wireless device served by the first network node, and
  establishing a neighbour relation with the first network node when requested by the first network node.

14. The method of claim 13, wherein the at least one allocated reference signal is obtained by sending an allocation request to the control node.

15. The method of claim 13, wherein multiple allocated reference signals are obtained from the control node and transmitted in respective mobility beams.

16. The method of claim 13, further comprising sending a release request to the control node to release the allocation of the at least one reference signal to the second network node.

17. The method of claim 13, wherein the at least one allocated reference signal is at least one bootstrap Mobility Reference Signal, MRS.

18. A second network node arranged to enable establishment of a neighbour relation with a first network node in a wireless network, wherein the second network node is configured to:
  obtain, from a control node, at least one reference signal allocated to the second network node, the at least one reference signal belonging to a set of reference signals reserved for neighbour relation establishment,
  transmit the at least one allocated reference signal to enable detection of the at least one allocated reference signal by a wireless device served by the first network node, and
  establish a neighbour relation with the first network node when requested by the first network node.

19. The second network node of claim 18, wherein the second network node is configured to obtain the at least one allocated reference signal by sending an allocation request to the control node.

20. The second network node of claim 18, wherein the second network node is configured to obtain multiple allocated reference signals from the control node to be transmitted in respective mobility beams.

21. The second network node of claim 18, wherein the second network node is configured to send a release request to the control node to release the allocation of the at least one reference signal to the second network node.

22. The second network node of claim 18, wherein the at least one allocated reference signal is at least one bootstrap Mobility Reference Signal, MRS.

23. A method performed by a control node, for enabling establishment of a neighbour relation between a first network node and a second network node in a wireless network, the method comprising:
  sending, at least to the first network node, a set of reference signals reserved for neighbour relation establishment,
  allocating at least one reference signal to the second network node, the at least one allocated reference signal belonging to the set of reserved reference signals, and
  providing, to the first network node, an identity of the second network node based on the at least one allocated reference signal when requested by the first network node.

24. The method of claim 23, wherein the at least one reference signal is allocated and provided to the second network node in response to an allocation request received from the second network node.

25. The method of claim 23, wherein multiple allocated reference signals are allocated to the second network node for use in respective mobility beams transmitted by the second network node.

26. The method of claim 23, further comprising releasing the allocation of the at least one reference signal to the second network node in response to a release request received from the second network node.

27. The method of claim 23, wherein the at least one allocated reference signal is at least one bootstrap Mobility Reference Signal, MRS.

28. A control node arranged to enable establishment of a neighbour relation between a first network node and a second network node in a wireless network, wherein the control node is configured to:

send, at least to the first network node, a set of reference signals reserved for neighbour relation establishment, allocate at least one reference signal to the second network node, the at least one allocated reference signal belonging to the set of reserved reference signals, and provide, to the first network node, an identity of the second network node based on the at least one allocated reference signal when requested by the first network node.

29. The control node of claim 28, wherein the control node is configured to allocate and provide the at least one reference signal to the second network node in response to an allocation request received from the second network node.

30. The control node of claim 28, wherein the control node is configured to allocate multiple allocated reference signals to the second network node for use in respective mobility beams transmitted by the second network node.

31. The control node of claim 28, wherein the control node is configured to release the allocation of the at least one reference signal to the second network node in response to a release request received from the second network node.

32. The control node of claim 28, wherein the at least one allocated reference signal is at least one bootstrap Mobility Reference Signal, MRS.

33. A computer program product comprising a non-transitory computer readable medium storing a computer program comprising instructions which, when executed on at least one processor, cause the at least one processor to carry out the method of claim 1.

* * * * *